United States Patent [19]
Frangou et al.

[11] Patent Number: 6,013,324
[45] Date of Patent: Jan. 11, 2000

[54] COATING COMPOSITION

[75] Inventors: Andrew Frangou, Windlesham; James William Casper, Stokenchurch; Deepak Gogna, Slough; William James Highcock, Farnham Common, all of United Kingdom

[73] Assignee: Imperial Chemical Industries PLC, London, United Kingdom

[21] Appl. No.: 09/091,002

[22] PCT Filed: Dec. 11, 1996

[86] PCT No.: PCT/EP96/05534

§ 371 Date: Jul. 30, 1998

§ 102(e) Date: Jul. 30, 1998

[87] PCT Pub. No.: WO97/22667

PCT Pub. Date: Jun. 26, 1997

[30] Foreign Application Priority Data

Dec. 19, 1995 [GB] United Kingdom .................... 9525914

[51] Int. Cl.[7] ............... B05D 1/36; B05D 7/16; C08F 24/00; C08F 265/04
[52] U.S. Cl. ................... 427/388.4; 427/407.1; 523/201; 523/406; 524/458; 524/501; 524/522; 524/523; 525/902; 525/309; 526/273
[58] Field of Search .................. 427/388.4, 409, 427/388.2, 407.1; 523/201, 406, 221; 525/902, 309; 526/273; 524/517, 515, 458, 501, 522, 523

[56] References Cited

U.S. PATENT DOCUMENTS

| 3,787,522 | 1/1974 | Dickie et al. . | |
|---|---|---|---|
| 4,086,300 | 4/1978 | Owens et al. . | |
| 4,540,740 | 9/1985 | Olson et al. | 524/811 |
| 4,569,966 | 2/1986 | Piccirilli et al. | 524/589 |
| 4,730,023 | 3/1988 | Sato et al. | 525/73 |
| 4,849,480 | 7/1989 | Antonelli et al. | 525/303 |
| 5,219,900 | 6/1993 | Davies et al. | 523/201 |
| 5,346,958 | 9/1994 | Yuakwa et al. | 525/124 |
| 5,412,039 | 5/1995 | Barsotti et al. | 525/309 |
| 5,763,528 | 6/1998 | Barsotti et al. | 525/63 |

FOREIGN PATENT DOCUMENTS

| 348 565 | 1/1990 | European Pat. Off. . |
|---|---|---|
| 667 360 | 8/1995 | European Pat. Off. . |
| 2 069 007 | 3/1971 | France . |
| 1 179 331 | 1/1970 | United Kingdom . |

*Primary Examiner*—Diana Dudash
*Attorney, Agent, or Firm*—Pillsbury Madison & Sutro LLP

[57] ABSTRACT

A sprayable aqueous coating composition for motor vehicles comprising an aqueous dispersion of addition polymer microparticles having a crosslinked core and a non-crosslinked stabilising mantle containing acid groups, characterised in that the crosslinked core comprises: i) a crosslinked inner core of an addition polymer and ii) a crosslinked outer core of addition polymer which is made from at least 10% by weight of monomers having a solubility in water of less than 0.1% by weight ratio of the inner core to the outer core being in the range 10:90 to 90:10.

21 Claims, No Drawings

COATING COMPOSITION

This invention relates to an aqueous coating composition and to a process for preparing the composition. It also relates to a coating process using the coating composition and to a substrate coated by the coating process.

The painting of motor vehicles broadly involves three stages. The first stage is called pre-treatment in which the bare metal is treated with various chemicals to improve corrosion resistance and the adhesion of subsequently applied paint coatings. In the second stage, one or more coats of primer and/or surfacer are applied to even out small surface irregularities and provide a foundation for subsequent layers. In the final stage, a topcoat is applied. The topcoat gives the vehicle its final appearance and also must resist the elements and physical damage.

The topcoat on modern motor vehicles, particularly cars, is often applied using what is known as a basecoat-clearcoat process. This involves applying two different layers of paint. The first layer is a pigmented composition called a basecoat which gives the vehicle its colour as well as any other pigment effects such as a metallic or pearlescent effect. The second and final layer is an unpigmented composition called a clearcoat which provides the final glossy appearance.

European Patent EP-B-0 038 127 discloses and claims an entirely revolutionary waterborne basecoat which can be used in the original manufacture of motor vehicles. The Patent discloses a pseudoplastic or thixotropic composition which comprises an aqueous dispersion of acrylic polymer in water. The dispersed polymer particles are made from various ethylenic monomers and are internally crosslinked. The combination of the internal crosslinking and the rheological properties make these basecoats particularly good for use with metallic pigments. These basecoats give particularly good metal flake orientation and hence good metallic "flip" effect, and are very resistant to disturbance by the subsequently applied clearcoat.

European Patent EP-B-0 300 612 discloses waterborne basecoats comprising similar dispersions which have a crosslinked core and a non-crosslinked stabilising mantle having salt forming groups. These dispersions are used in combination with another different type of dispersion so as to give basecoats which can be used for the refinishing of motor vehicles.

We have now found that by including in part of the core a minimum proportion of monomers having a low water solubility, we can produce waterborne basecoats which, when overcoated with a clearcoat, will form topcoats having improved resistance to humidity and which have very good "flip" appearance.

Our new addition polymer microparticles are made by polymerising ethylenically unsaturated monomers and consist of a crosslinked core from which there extends a non-crosslinked stabilising mantle containing acid groups.

According to the present invention there is provided a sprayable aqueous coating composition for motor vehicles comprising an aqueous dispersion of addition polymer microparticles having a crosslinked core and a non-crosslinked stabilising mantle containing acid groups, characterised in that the crosslinked core comprises;

i) a crosslinked inner core of an addition polymer
ii) a crosslinked outer core of an addition polymer which is made from at least 10% by weight of monomers having a solubility in water of less than 0.1% by weight, the weight ratio of the inner core to the outer core being in the range 10:90 to 90:10, preferably 25:75 to 75:25, and the mantle has a Tg of −50° C. to +50° C.

The outer core preferably surrounds the inner core. The inner and outer core can have the same monomer composition in which case the crosslinked core is homogeneous. Preferably the inner and outer core have a different monomer composition.

The outer core preferably has a Tg of at least 5° C. greater than that of the inner core, more preferably at least 10° C. greater, still more preferably at least 20° C. greater and most preferably at least 40° C. greater.

The outer core preferably has a Tg of greater than 10° C. The inner core preferably has a Tg of less than −10° C., more preferably less than −25° C.

The Tg of each portion of the microparticles can be calculated from the monomers from which that portion is made by using the Fox Equation (in which Tg is expressed in Kelvin):

$$\frac{1}{Tg} = \frac{\sum \text{wt fraction of monomer}}{Tg \text{ of homopolymer of that monomer}}$$

The outer core is made from at least 10% by weight of monomer having a water solubility of less than 0.1% by weight, crosslinking monomer and optionally other ethylenic monomer. The outer core is preferably made from at least 15% by weight of monomer having a water solubility of less than 0.1% by weight, more preferably at least 20%, most preferably at least 40% and especially above 90%. A particularly preferred outer core is made from between 95 and 99.5% by weight of monomer having a water solubility of less than 0.1% by weight and between 0.5 and 5% of crosslinking monomer.

The water solubility of certain monomers is given in J. W. Vanderhoff, J.Polym.Sci: Polymer Symposium, 72, 161–198 (1985) or F. C. Leonard, Vinyl & Diene Monomers, Parts I to III, published by John Wiley in their High Polymers Series in 1970. The water solubility of other monomers can be determined by preparing a saturated, equilibrated solution of the monomer in water at 25° C., extracting a sample of the aqueous phase and determining the monomer concentration by gas chromatography against an internal standard, for example isopropanol. Examples of monomers having water solubility of less than 0.1% by weight, with the literature figure for their solubilities in parentheses, are n-octyl acrylate (0.002%), dimethyl styrene (0.003%), alpha-methyl styrene (0.005), 2-ethylhexyl acrylate (0.001), vinyl toluene (0.008%), hexyl acrylate (0.008%), styrene (0.03%), vinyl hexanoate (0.004) and n-butyl methacrylate (0.03), of which 2-ethylhexyl acrylate and styrene are preferred. Styrene is particularly preferred because compositions in which the microparticle contains styrene show particularly good mechanical properties such as chip resistance.

Crosslinking monomers can be monomers having more than one ethylenic unsaturation which can polymerise with the other monomers so as to crosslink the polymer. Examples of suitable crosslinking monomers are allyl methacrylate, vinyl acrylate divinyl benzene, ethylene glycol dimethacrylate and glycerol triacrylate. The crosslinking monomer can also be a mixture of two monomers having coreactive functional groups such as epoxy and carboxyl (for example glycidyl methcarylate and methacrylic acid), anhydride and hydroxyl or isocyanate and hydroxyl.

Preferably the crosslinking monomer is allyl methacrylate. Preferably the outer core is made from 0.5 to 5% by weight of crosslinking monomer, more preferably 1 to 4%.

The other ethylenic monomers which can be included in the outer core have a water solubility greater than 0.1% by weight. Using the nomenclature (meth)acrylate to represent acrylate and methacrylate equally and (meth)acrylic to represent acrylic and methacrylic equally, examples of other ethylenic monomers are (meth)acrylic acid esters and nitriles and vinyl esters. Examples of (meth)acrylic acid esters are $C_{1-5}$ alkyl esters, particularly methyl (meth) acrylate, ethyl (meth)acrylate, propyl (meth)acrylate and butyl acrylate, and poly(ethylene oxide) esters such as polyethylene glycol methacrylates. Examples of nitriles are (meth)acrylonitrile. Examples of vinyl esters are vinyl $C_{1-4}$ alkanoate esters, particularly vinyl acetate, vinyl propionate and vinyl butyrate.

Most preferably the other ethylenic monomers are methyl methacrylate and butyl acrylate.

Most preferably the outer core comprises monomers selected from methyl methacrylate, butyl acrylate, 2-ethylhexyl acrylate, styrene and allyl methacrylate and mixtures of these.

The inner core can be made from crosslinking monomer and other ethylenic monomer, optionally together with monomers having a water solubility of less than 0.1% by weight.

The crosslinking monomer can be any of those described in relation to the outer core. Preferably the inner core is made from 0.5 to 5% by weight of crosslinking monomer.

The other ethylenic monomer can be any of those described in relation to the outer core. Preferably the inner core is made from 65 to 99.5% by weight of other ethylenic monomer.

Preferably the inner core is made from less than 30% by weight of monomers having a water solubility of less than 0.1% by weight, more preferably less than 25% by weight, and most preferably less than 10% by weight.

These monomers can be any of those referred to above in relation to the outer core. Most preferably the inner core is made from monomers selected from methyl methacrylate, butyl acrylate, styrene and allyl methacrylate.

The core in practice consists of a polymer seed onto which the core is formed. Where the core comprises an inner core and an outer core then the seed is regarded as part of the inner core.

The polymer seed can be formed from any of those monomers described above in relation to the monomers making up the core. Preferably the polymer seed is made from the same monomers as the core. Preferably, when the core comprises an inner core and an outer core, the seed comprises the same monomers as the inner core.

Preferably there are no hydrophilic monomers such as hydroxyl or acid functional monomers in the core because these tend to have a deleterious effect on water resistance in the final coatings.

The non-crosslinked mantle which is formed on the core contributes wholly or in part to the stability and rheological properties of the microparticles in dispersion. This mantle is made from monomer having acid groups, optionally monomer having other hydrophillic groups, optionally monomer having a water solubility of less than 0.1% by weight, and other ethylenic monomer.

Examples of monomers having acid groups are carboxylic acid, phosphate and sulphonate functional monomers such as (meth)acrylic acid. Preferably the monomer having acid groups is methacrylic acid.

Examples of monomers having other hydrophillic groups are hydroxy functional monomers and poly (ethylene oxide) containing monomers. Examples of hydroxy functional monomers are hydroxyethyl (meth)acrylate, hydroxybutyl (meth)acrylate and hydroxy propyl (meth)acrylate. A preferred hydroxy functional monomer is hydroxyethyl acrylate. Examples of poly (ethylene oxide) containing monomers are those containing a poly (ethylene oxide) moiety of molecular weight 750 to 2500, for example methoxy poly (ethylene oxide) 2000 methacrylate in which the 2000 indicates the molecular weight of the poly (ethylene oxide) moiety.

Examples of monomers having a solubility in water of less than 0.1% by weight are those monomers referred to as such above in relation to the outer core. Examples of other ethylenic monomers making up the mantle are those monomers referred to as such above in relation to the outer core. Preferred mantle monomers in addition to the monomer having acid groups are styrene, butyl methacrylate, butyl acrylate and methyl methacrylate.

Typically the mantle is made from 3 to 30%, preferably 5 to 20%, more preferably 5 to 19%, most preferably 5 to 17% by weight of monomers having acid groups and 70 to 97%, preferably 80 to 95%, more preferably 81 to 95% and most preferably 83 to 95% by weight of other ethylenic monomers and any monomers having a solubility in water of less than 0.1% by weight. When the mantle is also made from monomers having other hydrophillic groups these preferably make up from 5 to 35% by weight of the mantle.

The weight ratio of the core to mantle is preferably 5:95 to 95:5, more preferably 40:60 to 90:10.

Preferably the acid groups on the mantle are at least partially neutralised by the presence of a base such as an amine, for example dimethyl aminoethanol, so as to form a salt.

Preferably the microparticles have a diameter of 10 to 500 nm, more preferably 25 to 200 nm. Preferably the mantle has a Tg of −40 to +30° C.

The aqueous continuous phase in which the microparticles are dispersed comprises water, optionally with one or more water miscible organic solvents. Preferably the aqueous continuous phase comprises at least 50, more preferably at least 75 and most preferably at least 90 weight % water. An example of a suitable water miscible solvent is 2-butoxyethanol.

Preferably the microparticle dispersions themselves are pseudoplastic or thixotropic, more preferably pseudoplastic. Preferably the dispersions have a low shear viscosity (measured at 22% non-volatile content, containing 10% 2-butoxy ethanol and at pH 8.0, on a Couvette viscometer at a shear rate of $1s^{-1}$ and at 25° C.) of more than 0.5 Pa.s, and a high shear viscosity (measured under the same conditions on a cone and plate viscometer at a shear rate of $10^4 s^{-1}$ at 25° C.) of less than 0.1 Pa.s.

The microparticles can be made by the general processes described in EP-B-0 038 127, EP-B-0 001 489 and EP-B-0 300 612. In particular, they can be made by an emulsion polymerisation process which comprises;

A1) polymerising a mixture of ethylenic monomers comprising a crosslinking monomer and other ethylenic monomers so as to form a crosslinked addition polymer and then, A2) polymerising in the presence of the polymer from A1 a mixture of ethylenic monomers comprising at least 10% by weight of monomer having a solubility in water of less than 0.1% by weight, crosslinking monomer and optionally other ethylenic monomers, B) polymerising in the presence of the polymer from (A2) a different monomer mixture containing monomer having acid groups, optionally monomer having other hydrophillic groups and other ethylenic monomer so as to form a non-crosslinked stabilising mantle of polymer containing acid groups.

Preferably the monomer mixture in step (A2) produces a polymer having a Tg of at least 5° C. greater than the Tg of the polymer produced in (A1).

Preferably step (A1) comprises a first step in which a mixture of ethylenic monomers optionally comprising a crosslinking monomer is polymerised to form a polymer seed followed by polymerisation of further ethylenic monomers comprising crosslinking monomer so as to form the crosslinked inner core.

Preferably the emulsion polymerisation to form the polymer seed is carried out by firstly emulsifying the appropriate monomer mixture in water in the presence of a surfactant, heating this emulsion to a temperature at which polymerisation will occur in the presence of a polymerisation initiator and then adding a suitable polymerisation initiator.

Preferably the emulsion polymerisations to form the inner core (A1), the outer core (A2) and the mantle (B) are carried out by firstly emulsifying the appropriate monomer mixture in water in the presence of a surfactant, and then feeding this monomer emulsion into the aqueous dispersion from the previous stage in the presence of a polymerisation initiator at a temperature at which polymerisation occurs.

Suitable surfactants include anionic or non-ionic surfactants. Examples of suitable anionic surfactants are sodium lauryl sulphate, sodium dioctyl sulphosuccinate, disodium octadecyl sulphosuccinamate and the ammonium salt of a sulphate ester of a condensate of nonyl phenol and ethylene oxide. A suitable non-ionic surfactant is the poly(ethylene glycol) ether of nonyl phenol.

Suitable initiators include peroxides such as hydrogen peroxide and tertiary butyl hydroperoxide, persulphates such as potassium persulphate and ammonium persulphate, azo initiators such as azodiisobutyronitrile and redox initiator combinations such as ascorbic acid and hydrogen peroxide. Redox initiators have been found to be particularly good for water resistance. Optionally, metal salts such as iron, chromium or copper salts can also be added when redox initiators are used.

Preferably no chain transfer agent is present during step (B) and more preferably no chain transfer agent is used at all in making the microparticles.

Typically the polymerisation steps are carried out at a temperature of 40 to 98° C., preferably 50 to 90° C.

The acid groups on the mantle are at least partially neutralised by the addition of a base, during or preferably after the preparation of the polymer microparticles. Examples of suitable bases are alkali metal hydroxides and amines.

Amines are preferred. Suitable amines include ammonia and primary, secondary or tertiary alkylamines such as triethylamine and dimethyl ethanolamine.

The coating composition preferably comprises the aqueous dispersion as described above and a pigment.

The pigment can be any pigment or mixture of pigments suitable for use in an aqueous composition such as a solid colour pigment, a metallic pigment or a pearlescent pigment. Preferably the pigment is a metallic pigment or a pearlescent pigment or a mixture of these optionally together with any other pigment.

The coating composition can also contain co-solvents, for example 2-butoxyethanol to aid coalescence, extenders, biocides, dispersants, rheological modifiers, and wetting agents.

Coatings can be formulated for the original manufacture or refinishing of motor vehicles of many different kinds such as automobiles, trucks, trailers, transport containers and motorcycles. They can also be formulated for use in other applications such as for coating lawn mowers and bicycles.

Preferably the coating composition is a motor vehicle basecoat composition. Basecoat compositions are formulated for use under a clearcoat.

The coating composition can also comprise a crosslinker. Examples of suitable crosslinkers are polyisocyanates and aminoplast resins such as melamine formaldehydes and urea formaldehydes.

Where the coating composition is for use as a basecoat in vehicle refinishing, it is advantageous to include an aqueous dispersion of different addition polymer microparticles having $C_{1-4}$ alkoxypolyoxyalkylene stabiliser units as described in EP-B-0 300 612.

Preferably the composition comprises 5 to 95% by weight, more preferably 15 to 85%, most preferably 40 to 80%, of the crosslinked addition polymer microparticles of the invention, and 95 to 5% by weight, more preferably 85 to 15%, most preferably 60 to 20%, of the different addition polymer microparticles having $C_{1-4}$ alkoxy polyoxyalkylene stabiliser.

The addition polymer microparticles having $C_{1-4}$ alkoxy polyoxyalkylene stabiliser are optionally crosslinked. The microparticles are made from polyoxyalkylene group containing monomers, optionally crosslinking monomers, optionally also monomers having di-$C_{1-6}$ alkylamino, hydroxy or epoxy groups and other ethylenic monomers.

The polyoxyalkylene group containing monomers are $C_{1-4}$ alkoxypolyoxyalkylene (meth)acrylate esters. In practice, these have a molecular weight in the range 700 to 3,000, preferably 1000 to 2500 and more preferably around 2000. The $C_{1-4}$ alkoxy moiety can be methoxy, ethoxy or propoxy. Preferably it is methoxy.

The alkylene moiety is predominantly ethylene which may contain a proportion of propylene and/or butylene.

A preferred stabiliser is methoxypolyoxyethylene (2,000) methacrylate.

Preferably the addition polymer microparticles having $C_{1-4}$ alkoxy polyoxyalkylene stabiliser also contain a monomer having epoxy groups, such as glycidyl methacrylate.

The monomer having epoxy groups can make up to 5 to 50% by weight of the addition polymer. Preferably they make up 10 to 30% by weight of the polymer.

The optional crosslinking monomers can be any of those referred to above as crosslinking monomers in relation to the outer core of the microparticles having a crosslinked core and a stabilising mantle containing salt-forming groups. Preferably the polymer contains less than 1% by weight of crosslinking monomer and preferably it is not crosslinked.

Examples of other ethylenic monomers making up the addition polymer microparticles having $C_{1-4}$ alkoxy polyoxyalkylene stabiliser are those monomers referred to above in relation to the outer core of the microparticles having a crosslinked core and a stabilising mantle containing salt-forming groups as monomer having a solubility in water of less than 0.1% by weight and also those referred to there as other ethylenic monomers.

Preferably the other ethylenic monomers making up the addition polymer microparticles having $C_{1-4}$ alkoxy polyoxyalkylene stabiliser are $C_{1-6}$ alkyl acrylate monomers and vinyl benzene derivative monomers and, more preferably, they are styrene and butyl acrylate. Where these preferred monomers are used, the polymer preferably consists of 30 to 80% styrene, (more preferably 40 to 60%) and 20 to 70% butyl acrylate, (more preferably 40 to 60%).

The exact proportion of monomers making up the polymer microparticles having $C_{1-4}$ alkoxypolyoxyalkylene stabiliser is chosen so as to obtain the appropriate and desired physical properties in the polymer produced. The monomers are selected primarily so as to control the Tg or glass transition temperature. In particular the monomers are selected such that the theoretical Tg as calculated by the Fox equation is from −50° C. to +50° C. Preferably it is −10° C. to +10° C.

Preferably the polymer microparticles having $C_{1-4}$ alkoxypolyoxyalkylene stabiliser units have a diameter of 10 to 1000 nm, more preferably 50 to 500 nm.

The polymer microparticles having $C_{1-4}$ alkoxypolyoxyalkylene stabiliser units can be made by known methods. For example, they can be made by emulsion polymerisation or by an aqueous dispersion polymerisation process as described in EP-A-0013478.

The aqueous dispersion of polymer microparticles having $C_{1-4}$ alkoxy polyoxyalkylene stabiliser units can be added to the coating composition by stirring it in.

The coating compositions of the invention can also comprise a polyurethane resin dispersion. Aqueous dispersions of polyurethane resin comprise particles of polyurethane polymer dispersed in an aqueous medium. The polyurethane polymer has pendent acid groups, and these acid groups are neutralised in the presence of a base to form anionic groups which stabilise the dispersion.

The polyurethane can be made by the reaction of a polyisocyanate, a polyol, a compound having an acid group and optionally a chain extending compound such as a polyamine or hydrazine.

Polyisocyanates are compounds with more than one isocyanate group. Examples of suitable diisocyanates are toluene diisocyanate, hexamethylene diisocyanate, isophorone diisocyanate and dicyclohexyl methane diisocyanate. Examples of suitable three or more functional isocyanates are the reaction products of diisocyanates with polyols such as trimethylol propane, glycerol and pentaerythritol. Many such polyisocyanates are commercially available for example under the Desmodur trade mark from Bayer. A preferred polyisocyanate is a mixture of 2,4'- and 4,4'-dicyclohexyl methane diisocyanate, available as Desmodur W from Bayer.

Polyols are compounds with more than one hydroxyl group. Examples of suitable polyols are simple polyols such as those from which the polyisocyanate can be made, polyester polyols and polyether polyols. A preferred polyol is a polyester polyol.

The compound having an acid group preferably has an acid group, such as a carboxylic acid group and two groups which can react with either the polyisocyanate or the polyol. An example of a group which can react with the polyol is an isocyanate group. Examples of groups which can react with the polyisocyanate are hydroxyl groups and amine groups. One example of a compound having two hydroxyl groups and an acid group is dimethylol propionic acid.

Examples of polyamines are ethylene diamine, isophorone diamine and diethylene triamine.

The polyurethane dispersions are generally dispersed using a base which ionises the acidic groups on the polymer and so stabilises the dispersion. The base can be an inorganic base, ammonia or an amine. Preferably the base is an amine.

The polyisocyanate, the compound having an acid group and the polyol can be reacted together in an organic solvent to produce an isocyanate terminated prepolymer which can be dispersed in water in the presence of the base and then chain extended by adding the polyamine. Alternatively, the prepolymer can be chain extended in solution and then the final polyurethane polymer can be dispersed in water in the presence of the base.

Examples of commercially available aqueous polyurethane dispersions are Witcobond 240 from Baxenden Chemical co., Bayhydrol PR135 from Bayer, Neorez R984 from Zeneca Specialties, Cydrothane HP 1035 from Cyanamid, Spensol L52 from Spenser-Kellogg, Flexthane 610 from Air Products and Incorez W830/074 from Industrial Copolymers Ltd.

The coating compositions can be used to coat motor vehicles in a coating process which comprises applying a layer of the composition to the surface of the vehicle and subsequently allowing or causing the layer to dry or cure. When the coating composition is a basecoat composition, a layer of clearcoat is usually applied over the basecoat.

The clearcoat can be applied after the basecoat has dried or cured. Alternatively the clearcoat can be applied only a short time after the basecoat and before the basecoat has fully dried or cured. In this case both basecoat and clearcoat are dried and cured in a single step. This is referred to as a "wet-on-wet" process.

The composition can be applied by conventional means such as brushing, rolling or spraying. Motor vehicles are preferably painted by spraying.

The layer can be allowed or caused to dry or cure either by leaving it at ambient temperatures or by the use of heat. Preferably the compositions are allowed or caused to cure at temperatures between 0 and 160° C. Typically, when the compositions are used for the refinishing of motor vehicles they are caused or allowed to dry or cure at temperatures between 10 and 70° C. and for the original painting of motor vehicles between 100 and 200° C., usually 110 to 150° C. The drying or curing step takes, for example, between 10 minutes and 24 hours depending on the conditions used and typically between 10 minutes and 5 hours.

Conventional clearcoats which are well known in the art and which are commercially available can be used.

The invention will now be illustrated by means of the following Examples in which all parts are by weight;

EXAMPLES

1. Preparation of Aqueous Dispersions 1 to 6;
Crosslinked Polymer Microparticles with Inner and Outer Core and Stabilising Mantle The following is a general method for Aqueous Dispersions 1 to 6 which uses the components given in Tables 1 to 3 below. All of Aqueous Dispersions 1 to 6 have an inner and an outer core. Aqueous Dispersions 3, 5 and 6 are according to the invention, while Aqueous Dispersions 1, 2 and 4 are comparative.

1.1 Formation of Polymer Seed

The inner core monomers were emulsified in demineralised water in the presence of surfactant (the ammonium salt of the sulphate ester of a condensate of nonyl phenol and 20 moles of ethylene oxide sold as Rhodapex CO436) in the amounts given in Table 1 using a Silverson Homogeniser (trade mark) for 20 minutes to form the inner core monomer emulsion. 8.8% by weight of the inner core monomer emulsion was added to a solution of Rhodapex CO436 (0.228 parts) in demineralised water (24.806 parts) preheated to 80–85° C. in a nitrogen atmosphere with stirring. The mixture was stirred for 5 minutes and then the initiator solution from Table 1 was added. This mixture was stirred for 15 minutes to form a polymer seed.

TABLE 1

| Inner Core Monomers | Dispersion | | |
|---|---|---|---|
| | 1 | 2 | 3 |
| Styrene | 0.0 | 7.925 | 0.0 |
| 2-Ethylhexyl Acrylate | 0.0 | 6.357 | 0.0 |
| Methyl Methacrylate | 2.447 | 0.0 | 2.447 |
| Allyl Methacrylate | 0.443 | 0.443 | 0.443 |
| Butyl Acrylate | 11.83 | 0.0 | 11.83 |
| Surfactant | 0.172 | 0.172 | 0.172 |
| Demineralised Water | 10.83 | 10.83 | 10.83 |
| Initiator | | | |
| Demineralised Water | 1.157 | 1.157 | 1.157 |
| Ammonium Persulphate | 0.047 | 0.047 | 0.047 |
| | 4 | 5 | 6 |
| Styrene | 0.0 | 0.0 | 2.447 |
| 2-Ethylhexyl Acrylate | 0.0 | 0.0 | 0.0 |
| Methyl Methacrylate | 2.447 | 1.142 | 0.0 |
| Allyl Methacrylate | 0.443 | 0.201 | 0.443 |
| Butyl acrylate | 11.83 | 5.374 | 11.83 |
| Surfactant | 0.172 | 0.079 | 0.172 |
| Demineralised Water | 10.83 | 4.896 | 10.83 |
| Initiator | | | |
| Dimineralised water | 1.157 | 0.868 | 1.157 |
| Ammonium Persulphate | 0.047 | 0.022 | 0.047 |

1.2 Formation of Inner Core

The remainder of the inner core monomer emulsion was fed into the mixture over 30 minutes at 80–85° C. and the mixture was stirred for a further hour so as to form the inner core.

1.3 Formation of Outer Core

The outer core monomers were emulsified in demineralised water in the presence of surfactant (Rhodapex CO436) in the proportions given in Table 2 so as to form the outer core monomer emulsion. The initiator solution given in Table 2 was added to the inner core dispersion and then the outer core monomer emulsion was added over 30 minutes. The mixture was stirred for a further hour so as to form an inner core/outer core dispersion.

TABLE 2

| Outer Core Monomers | Dispersion | | |
|---|---|---|---|
| | 1 | 2 | 3 |
| Styrene | 0.0 | 0.0 | 7.408 |
| 2-Ethylhexyl Acrylate | 0.0 | 0.0 | 4.373 |
| Methyl Methacrylate | 6.523 | 6.523 | 0.0 |
| Allyl Methacrylate | 0.366 | 0.366 | 0.366 |
| Butyl Acrylate | 5.257 | 5.257 | 0.0 |
| Surfactant | 0.142 | 0.142 | 0.142 |
| Demineralised Water | 8.75 | 8.75 | 8.75 |
| Initiator | | | |
| Demineralised water | 1.157 | 1.157 | 1.157 |
| Ammonium persulphate | 0.039 | 0.039 | 0.039 |
| | 4 | 5 | 6 |
| Styrene | 0.0 | 12.293 | 2.604 |
| 2-Ethylhexyl Acrylate | 0.0 | 7.255 | 0.0 |
| Methyl Methacrylate | 6.523 | 0.0 | 3.919 |
| Allyl Methacrylate | 0.366 | 0.604 | 0.366 |
| Butyl Acrylate | 5.257 | 0.0 | 5.257 |
| Surfactant | 0.142 | 0.236 | 0.142 |
| Demineralised Water | 8.75 | 14.688 | 8.75 |

TABLE 2-continued

| Outer Core Monomers | Dispersion | | |
|---|---|---|---|
| Initiator | | | |
| Demineralised Water | 1.157 | 1.447 | 1.157 |
| Ammonium Persulphate | 0.039 | 0.065 | 0.039 |

1.3 Formation of Stabilising Mantle Containing Salt Forming Groups

The mantle monomers given in Table 3 were emulsified in demineralised water (8.68 parts) in the presence of Rhodapex CO436 (0.141 parts) so as to form a dispersion of mantle monomers. This dispersion of mantle monomers was added to the inner core/outer core dispersion over 30 minutes simultaneously with an initiator solution of ammonium persulphate (0.016 parts) in demineralised water (1.91 parts). The mixture was held at 80–85° C. for one hour. A solution of dimethyl ethanolamine (0.579 parts) in demineralised water (2.06 parts) was added over 20 minutes. The resulting dispersion was filtered and allowed to cool.

TABLE 3

| Mantle Monomers | Dispersion | | |
|---|---|---|---|
| | 1 | 2 | 3 |
| Styrene | 0.0 | 0.0 | 0.0 |
| Butyl Methacrylate | 0.0 | 0.0 | 0.0 |
| Methyl Methacrylate | 3.426 | 3.426 | 3.426 |
| Hydroxethyl Acrylate | 0.792 | 0.792 | 0.792 |
| Butyl Acrylate | 3.148 | 3.148 | 3.148 |
| Methacrylic Acid | 0.553 | 0.553 | 0.553 |
| | 4 | 5 | 6 |
| Styrene | 1.979 | 1.98 | 1.389 |
| Butyl Methacrylate | 2.376 | 2.376 | 0.0 |
| Methyl Methacrylate | 0.0 | 0.0 | 2.037 |
| Hydroxyethyl Acrylate | 0.792 | 0.792 | 0.792 |
| Butyl Acrylate | 2.218 | 2.218 | 3.148 |
| Methacrylic Acid | 0.553 | 0.553 | 0.553 |

The product obtained was an aqueous dispersion of polymer particles having a crosslinked core and a stabilising mantle having at least partially neutralised acid groups.

2. Silver Basecoat Compositions 1 to 6

Silver Basecoat compositions 1 to 6 were made from Aqueous Dispersions 1 to 6 respectively as follows;

2.1 A solution of alkylarylphosphate ester of the type described in EP-A-0 206 615 (6.069 parts) was made in butoxyethanol (4.862 parts) and neutralised to pH 7.6 with dimethylamino ethanol (0.345 parts).

2.2 A pigment paste was prepared by stirring an aluminium paste (60% metal in a hydrocarbon carrier sold under trademark Silberline SS 5245 AR; 27.565 parts) with 2-butoxyethanol (27.565 parts) for 2 hours at room temperature. The mixture was left to stand over night. The solution from 2.1 above was added and the mixture was stirred for 15 minutes. A melamine formaldehyde resin (sold under the trademark Beetle BE370; 14.931 parts) was added followed by a second melamine formaldehyde resin (sold under the trademark Cymel 325; 18.664 parts) and the mixture was stirred for 15 minutes to form the pigment paste.

2.3 The Crosslinked microparticle dispersions, prepared as in 1 above (245.614 parts) was added with stirring to the aluminium pigment paste (100.436 parts) from 2.2 above. 2-butoxy ethanol (41.332 parts) was added.

2.4 Demineralised water, a 10% aqueous dimethylaminoethanol solution in demineralised water and a 2% by weight Primal ASE 60 (trademark of Rohm & Haas) solution in demineralised water were added so as to give a final pH of 8.0 to 8.2, a viscosity of 20–24 poise (as measured on a Couvette viscometer at $1s^{-1}$ and 20° C.) and a non-volatile solids content of 16%.

3. Mica-based Green Basecoat Compositions 7 to 12

Mica-based green Basecoat Compositions 7 to 12 were made from Aqueous Dispersions 1 to 6 respectively as follows;

3.1 To 2-butoxyethanol (76.9 parts) were added sequentially with stirring, mica pigment (Irodin 9235 WRII; 31.7 parts), dimethylamino ethanol (0.5 parts), latex from 1 above (75 parts), melamine formaldehyde (Cymel 325; 27 parts), melamine formaldehyde (Beetle BE370; 17.3 parts); Latex from 1 above (202.8 parts) and 2-butoxyethanol (52 parts). A millbase comprising blue and black pigments, melamine formaldehyde resin and solvent (43 parts) was added.

3.2 Demineralised water, a 10% aqueous dimethylaminoethanol solution in demineralised water and a 2% by weight Primal ASE 60 (trademark of Rohm & Haas) solution in demineralised water were added so as to give a final pH of 8.0 to 8.2, a viscosity of 20–24 poise (as measured on a Couvette viscometer at $1s^{-1}$ and 20° C.) and a non-volatile solids content of 16%.

4. Application of Basecoat Compositions 1 to 12

4.1 Coating compositions 1 to 12 were applied by spray application on to pretreated and electrocoated steel panels (ED 5100 from ACT Laboratories Inc) which had been coated with a surfacer (M330–7139 from IDAC (UK) Ltd). The spraying was carried out at 60 psi at 20° C. and 65% relative humidity in two coats to give a basecoat thickness of 12 to 14 µm. The coated panels were allowed to stand at room temperature for 30 minutes and were then stored at 80° C. for 10 minutes.

4.2 A layer of a commercially available clearcoat (M190–517 from IDAC (UK) Ltd) was applied, the coated panel was allowed to stand for 30 minutes at room temperature and then stoved at 130° C. for 30 minutes.

5. Testing the Coated Panels for Humidity Resistance

The panels from 5 above were tested according to ASTM D4585-92) as follows. The panels were exposed in a humidity cabinet with the coated side down. The water vapour in the cabinet was maintained at 60° C. as measured 2.5 cm from the panel surface. The backs of the panels were exposed to room temperature so as to induce condensation on the painted surface. The extent of blistering (ASTM D714-87) was noted after 4 days.

6. Test Results

The test results for compositions 1 to 12 are summarised in Table 4 below. The numbers relate to the size of the blisters on a scale of 1 to 10 (1 being about 1 cm in diameter and 10 being microscopic) and the letters refer to the density of blistering on a standard scale from None, VF (Very Few), F (Few), M (Medium) and MD (Medium Dense) and D (Dense).

TABLE 4

| Composition | Humidity Test Result |
| --- | --- |
| 1 (Comparative) | 6 M |
| 2 (Comparative) | 6 M |
| 3 | 6 VF |
| 4 (Comparative) | 6 M |
| 5 | None |
| 6 | 8 F |
| 7 (Comparative) | 10 M |

TABLE 4-continued

| Composition | Humidity Test Result |
| --- | --- |
| 8 (Comparative) | 8 MD |
| 9 | 8 VF |
| 10 (Comparative) | 8 D |
| 11 | None |
| 12 | 8 F |

7. Preparation of Aqueous Dispersions 7 and 8 Having a Homogeneous Core

The general method given below was used to make Aqueous Dispersions 7 and 8 which use the components given in Tables 5 and 6 below. Aqueous dispersions 7 and 8 both have a homogeneous core. Aqueous Dispersion 7 is according to the invention, while Aqueous Dispersion 8 is comparative.

7.1 Formation of Polymer Seed

Methyl methacrylate (0.542 parts) and butyl acrylate (0.585 parts) were added to a solution of Rhodapex CO436 (0.250 parts) in dimeralised water (46.677 parts) pre-heated to 80–85° C. in a nitrogen atmosphere with stirring. The mixture was stirred for 5 minutes and then an initiator solution comprising demineralised water (0.583 parts) and ammonium persulphate (0.017 parts) was added. This mixture was stirred for 15 minutes to form a polymer seed.

7.2 Formation of core

The core monomers given in Table 5 were emulsified in demineralised water (11.870 parts) in the presence of surfactant (the ammonium salt of the sulphate ester of a condensate of nonyl phenol and 20 moles of ethylene oxide sold as Rhodapex CO436; 0.163 parts) using a Silverson Homogeniser (trade mark) for 20 minutes to form the core monomer emulsion.

TABLE 5

| | Dispersion | |
| --- | --- | --- |
| Core Monomers | 7 | 8 |
| Styrene | 10.179 | 0.0 |
| 2-Ethylhexyl Acrylate | 8.105 | 0.0 |
| Methyl Methacrylate | 0.0 | 8.864 |
| Allyl Methacrylate | 0.601 | 0.601 |
| Butyl Acrylate | 0.0 | 9.42 |

The core monomer emulsion was fed into the mixture along with an initiator mixture of demineralised water (4.33 parts) and ammonium persulphate (0.034 parts) over 30 minutes at 80–85° C. and the mixture was stirred for a further hour so as to form the core.

7.3 Formation of Stabilising Mantle Containing Salt Forming Groups

The mantle monomers given in Table 6 were emulsified in demineralised water (6.571 parts) in the presence of Rhodapex CO436 (0.102 parts) so as to form a dispersion of mantle monomers.

TABLE 6

|  | Dispersion | |
|---|---|---|
| Mantle Monomers | 7 | 8 |
| Hydroxethyl Acrylate | 1.178 | 1.178 |
| Butyl Acrylate | 3.887 | 3.887 |
| Methacrylic Acid | 0.824 | 0.824 |

The dispersion of mantle monomers was added to the core dispersion over 30 minutes simultaneously with an initiator solution of ammonium persulphate (0.016 parts) and borax (0.014 parts) in demineralised water (0.519 parts). The mixture was held at 80–85° C. for one hour. A solution of dimethyl ethanolamine (0.488 parts) in demineralised water (2.464 parts) was added over 20 minutes. The resulting dispersion was filtered and allowed to cool.

The product obtained was an aqueous dispersion of polymer particles having a crosslinked core and a stabilising mantle having at least partially neutralised acid groups.

8. Preparation of Comparative Dispersion 9 According to EP-A-0 348 565

Example 34 of EP-A-0 348 565 was repeated as comparative dispersion 9;

6.6% Of Monomer emulsion 1 listed in Table 7 below was added to a stirred mixture of deionised water (1020 g), sodium lauryl sulphate (1.69 g) and of dibasic ammonium phosphate (0.9 g) at 81° C. under nitrogen. A mixture of ammonium persulphate (1.1 g) and deionised water (28 g) was added and the mixture stirred for 17 minutes. The remainder of monomer emulsion 1 in Table 7 was added slowly over 72 minutes along with Cofeed 1 from Table 7 maintaining the mixture at about 81° C. The mixture was stirred for a further 20 minutes at 81° C. and a solution of ammonium persulphate (1.1 g) in deionised water (55 g) was added over a 10 minute period. Monomer emulsion 2 from table 7 was added over a period of 108 minutes while cofeed 2 from Table 7 was added over 138 minutes at 81° C.

The dispersion was neutralised by adding a solution of basic ammonium phosphate (24.4) in deionised water (632 g) over 10 minutes followed by a solution of 28% aqueous ammonia (193 g) in deionised water (200 g).

TABLE 7

|  | Monomer Emulsion 1 | Monomer Emulsion 2 |
|---|---|---|
| Deionised water | 150 | 216 |
| Sodium lauryl sulphate | 5.4 | 3.3 |
| styrene | 425.25 | — |
| allyl methacrylate | 22.5 | — |
| methacrylic acid | 2.25 | 235.25 |
| n-dodecylmercaptan | — | 40.5 |
| methylmethacrylate | — | 438.75 |
|  | Cofeed 1 | Cofeed 2 |
| deionised water | 77.0 | 115.0 |
| ammonium persulphate | 0.44 | 1.49 |

9. Preparation of Comparative Dispersion 10 according to EP-A-0 348 565

Example 47 of EP-A-0 348 565 was repeated as comparative dispersions 10.

40 g of Monomer Emulsion 1 listed in Table 8 below was added to deionised water (1102 g) with stirring at 81° C. under nitrogen. A mixture of ammonium persulphate (1.1 g) and deionised water was added and the mixture stirred for 17 minutes. The remainder of Monomer Emulsion 1 from Table 8 was added over over 135 minutes along with cofeed 1 in Table 8, at 81° C. under nitrogen. The mixture was stirred for 30 minutes at 81° C. Monomer mixture 2 from table 8 was added over a period of 45 minutes while cofeed 2 from Table 7 was added over 75 minutes at 81° C.

The dispersion was neutralised to pH 8.5 by adding a solution of 28% aqueous ammonia in deionised water.

TABLE 8

|  | Monomer Emulsion 1 | Monomer Emulsion 2 |
|---|---|---|
| Deionised water | 405 | 75 |
| Sodium lauryl sulphate | 12.37 | 2.07 |
| 2-ethylhexyl acrylate | 433 | — |
| allyl methacrylate | 37 | — |
| methacrylic acid | 6.2 | 82.5 |
| n-octyl mercaptan | — | 12.4 |
| methylmethacrylate | 761 | 330 |
|  | Cofeed 1 | Cofeed 2 |
| deionised water | 240 | 135 |
| ammonium persulphate | 2.92 | 1.65 |

10. Silver Basecoat Compositions 13 to 16

Silver Basecoat compositions 13 to 16 were made from Aqueous Dispersions 7 to 10 respectively using the same general method as silver basecoats 1 to 6 as follows:

10.1 A solution of alkylarylphosphate ester of the type described in EP-A-0 206 615 (6.069 parts) was made in butoxyethanol (4.862 parts) and neutralised to pH 7.6 with dimethylamino ethanol (0.345 parts).

10.2 A pigment paste was prepared by stirring an aluminium paste (60% metal in a hydrocarbon carrier sold under trademark Silberline SS 5245 AR; 27.565 parts) with 2-butoxyethanol (27.565 parts) for 2 hours at room temperature. The mixture was left to stand over night. The solution from 10.1 above was added and the mixture was stirred for 15 minutes. A melamine formaldehyde resin (sold under the trademark Beetle BE370; 14.931 parts) was added followed by a second melamine formaldehyde resin (sold under the trademark Cymel 325; 18.664 parts) and the mixture was stirred for 15 minutes to form the pigment paste.

10.3 The Crosslinked microparticle dispersions, prepared as in 7 to 9 above (245.614 parts) were added with stirring to the aluminium pigment paste (100.436 parts) from 10.2 above. 2-butoxy ethanol (41.332 parts) was added.

10.4 Demineralised water, a 10% aqueous dimethylaminoethanol solution in demineralised water and a 2% by weight Primal ASE 60 (trademark of Rohm & Haas) solution in demineralised water were added so as to give a final pH of 8.0 to 8.2, a viscosity of 20–24 poise (as measured on a Couvette viscometer at $1s^{-1}$ and 20° C.) and a non-volatile solids content of 16%.

11. Application and testing of Silver Basecoat Compositions 1 to 6 and 13 to 16

A comparative test was carried out of basecoat compositions 1 to 6 and 13 to 16 as follows. Compositions 1 to 6 and 13 to 16 were applied to steel panels, and clearcoated in exactly the same way as given in paragraphs 4.1 and 4.2 above. The panels were tested for humidity resistance in exactly the same way as in paragraph 5 above.

12. Test Results

The test results for compositions 1 to 6 and 13 to 16 are summarised in Table 9 below. The numbers relate to the size of the blisters on a scale of 1 to 10 as referred to in paragraph 6 above and the letters refer to the density of blistering on a standard scale from None, VF (Very Few), F (Few), M (Medium) and MD (Medium Dense) and D (Dense). In the table (C) indicates comparative compositions.

TABLE 9

| Silver Basecoat | Rating |
| --- | --- |
| 1 (C) | 8 M/F |
| 2 (C) | 9 F |
| 3 | 10 VVF |
| 4 (C) | 9 M |
| 5 | 10 VVF |
| 6 | 10 VF |
| 13 | 10 VF |
| 14 (C) | 8–9 M |
| 15 (C) | 2 D |
| 16 (C) | 2 D |

We claim:

1. A sprayable aqueous coating composition for motor vehicles comprising an aqueous dispersion of addition polymer microparticles having a crosslinked core and a non-crosslinked stabilising mantle containing acid groups, characterised in that the crosslinked core comprises;
   i) a crosslinked inner core of an addition polymer and,
   ii) a crosslinked outer core of addition polymer which is made from at least 10% by weight of monomers having a solubility in water of less than 0.1% by weight,
   the weight ratio of the inner core to the outer core being in the range 10:90 to 90:10, the mantle having a Tg of −50° C. to +50° C., and being made from 5 to 19% by weight of monomers having acid groups.

2. A coating composition as claimed in claim 1 in which the monomers having a solubility in water of less than 0.1% by weight are selected from 2-ethylhexyl acrylate, styrene and mixtures thereof.

3. A coating composition as claimed in claim 1 in which the monomers having a solubility in water of less than 0.1% by weight comprise styrene.

4. A coating composition as claimed in any one of claims 1 to 3 in which the outer core polymer has a Tg of at least 5° C. greater than the Tg of the inner core polymer.

5. A coating composition as claimed in any one of claims 1 to 3 in which the outer core has a Tg of greater than 10° C.

6. A coating composition as claimed in any one of claims 1 to 3 in which the outer core is made from at least 15% by weight of monomers having a water solubility of less than 0.1% by weight.

7. A coating composition as claimed in any one of claims 1 to 3 in which the outer core is made from monomers selected from methyl methacrylate, butyl acrylate, 2-ethylhexyl acrylate, styrene and allyl methacrylate and mixtures of these.

8. A coating composition as claimed in any one of claims 1 to 3 in which the inner core has a Tg of less than −10° C.

9. A coating composition as claimed in any one of claims 1 to 3 in which the inner core is made from monomers selected from methyl methacrylate, butyl acrylate, styrene and allyl methacrylate and mixtures of these.

10. A coating composition as claimed in claim 1 in which the outer core and the inner core have the same monomer composition.

11. A coating composition as claimed in any one of claims 1 to 3 in which the mantle is made from 3 to 30% by weight of monomers having acid groups and 70 to 97% by weight of other ethylenic monomers.

12. A coating composition as claimed in any one of claim 1 to 3 formulated for use as a basecoat.

13. A coating composition as claimed in claim 12 which contains a metallic pigment or a pearlescent pigment or a mixture of these.

14. A coating composition as claimed in any one of claims 1 to 3 also comprising a crosslinker.

15. A coating composition as claimed in any one of claims 1 to 3 which also comprises a dispersion of different addition polymer microparticles having $C_{1-4}$ alkoxy polyoxyalkylene stabiliser units.

16. A coating composition as claimed in claim 15 which comprises 5 to 95% by weight said addition polymer microparticles and 95 to 5% by weight of the different addition polymer microparticles having $C_{1-4}$ alkoxy polyoxyalkylene stabiliser units.

17. A coating composition as claimed in claim 1 which also comprises a polyurethane resin dispersion.

18. A sprayable aqueous coating composition for motor vehicles comprising an aqueous dispersion of addition polymer microparticles made by a process which comprises;
   A1) polymerising a mixture of ethylenic monomers comprising a crosslinking monomer and other ethylenic monomers so as to form a crosslinked addition polymer,
   A2) polymerising in the presence of the polymer from A1 a mixture of ethylenic monomers comprising at least 10% by weight of monomer having a solubility in water of less than 0.1% by weight, crosslinking monomer and optionally other ethylenic monomers,
   B) polymerising in the presence of the polymer from (A2) a different monomer mixture containing 5 to 19% by weight of monomer having acid groups, optionally monomer having other hydrophillic groups and other ethylenic monomer so as to form a non-crosslinked stabilising mantle of polymer containing acid groups, which has a Tg of −50° C. to +50° C.

19. A process for producing a sprayable aqueous coating composition for motor vehicles comprising:
   A1) polymerising a mixture of ethylenic monomers comprising a crosslinking monomer and other ethylenic monomers so as to form a crosslinked addition polymer,
   A2) polymerising in the presence of the polymer from (A1) a different mixture of ethylenic monomers comprising at least 10% by weight of monomer having a solubility in water of less than 0.1% by weight, crosslinking monomer and optionally other ethylenic monomers,
   B) polymerising in the presence of the polymer from (A2) a different monomer mixture containing 5 to 19% by weight of monomer having acid groups, optionally monomer having other hydrophillic groups and other ethylenic monomer so as to form a non-crosslinked stabilising mantle of polymer containing acid groups having a Tg of −50° C. to +50° C.,
   so as to form an aqueous dispersion of addition polymer microparticles having a crosslinked core and a non-crosslinked stabilising mantle.

20. A process of coating a motor vehicle which comprises spraying on to the surface of the vehicle a layer of an aqueous coating composition comprising an aqueous dispersion of addition polymer microparticles having crosslinked core and a non-crosslinked stabilising mantle containing acid groups, characterised in that the crosslinked core comprises;

i) a crosslinked inner core of an addition polymer and, ii) a crosslinked outer core of addition polymer which is made from at least 10% by weight of monomers having a solubility in water of less than 0.1% by weight, the weight ratio of the inner core to the outer core being in the range 10:90 to 90:10, and subsequently allowing or causing the layer to dry or cure.

21. A process for applying a basecoat-clear coating to a motor vehicle which comprises spraying on to the surface of the vehicle a first layer of an aqueous coating composition comprising an aqueous dispersion of addition polymer microparticles having a crosslinked core and a non-crosslinked stabilising mantle containing acid groups, characterised in that the crosslinked core comprises;

i) a crosslinked inner core of an addition polymer and, ii) a crosslinked outer core of addition polymer which is made from at least 10% by weight of monomers having a solubility in water of less than 0.1% by weight, the weight ratio of the inner core to the outer core being in the range 10:90 to 90:10, followed by spraying a layer of a clearcoat over this first layer and then causing both layers to dry or cure together.

* * * * *